US011714954B1

(12) United States Patent
Manason et al.

(10) Patent No.: US 11,714,954 B1
(45) Date of Patent: Aug. 1, 2023

(54) SYSTEM FOR DETERMINING RELIABILITY OF EXTRACTED DATA USING LOCALIZED GRAPH ANALYSIS

(71) Applicant: AMAZON TECHNOLOGIES, INC., Seattle, WA (US)

(72) Inventors: Vijay Daniel Manason, Bangalore (IN); Sathya Prakash Podila Venkata Subramanya, Bangalore (IN); Ansar Pasha, Tumkur (IN); Meghana Agrawal, Jaipur (IN); Mandar Subhashrao Joshi, Pune (IN); Shrikant G Nayak, Bangalore (IN); Sandeep Bhaskar, Chennai (IN); Antonisamy Arokiasamy, Coimbatore (IN); Navin Anand, Bangalore (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/119,465

(22) Filed: Dec. 11, 2020

(51) Int. Cl.
*G06F 40/137* (2020.01)
*G06F 40/143* (2020.01)
(Continued)

(52) U.S. Cl.
CPC ........ *G06F 40/137* (2020.01); *G06F 16/9024* (2019.01); *G06F 16/986* (2019.01); *G06F 40/143* (2020.01); *G06F 40/30* (2020.01)

(58) Field of Classification Search
CPC .. G06F 40/137; G06F 40/9024; G06F 40/986; G06F 40/143; G06F 40/30; G06F 16/9024; G06F 16/986
See application file for complete search history.

(56) References Cited

U.S. PATENT DOCUMENTS 8,589,366 B1 * 11/2013 Younes ................. G06F 40/143
707/602
2010/0145902 A1 * 6/2010 Boyan ................... G06F 16/958
715/200
(Continued)

FOREIGN PATENT DOCUMENTS

WO WO-0163486 A2 * 8/2001 ........... G06F 16/951

OTHER PUBLICATIONS

"Document Object Model", Wikipedia, 6 pages. Retrieved from the Internet: URL: http://en.wikipedia.org/wiki/Document_Object_Model on Oct. 22, 2020.
(Continued)

*Primary Examiner* — Chau T Nguyen
(74) *Attorney, Agent, or Firm* — Lindauer Law, PLLC

(57) ABSTRACT

A webpage containing information to be extracted may undergo changes to a layout of elements that present the information. These changes could result in an inability to retrieve the information later. A first graph is determined that represents elements of a first version of a webpage at a first time. An element in the first graph for which information is being acquired is specified. A relevant portion of the first graph is designated that includes the element and immediate neighbors in the first graph. Later, a second version of the webpage is retrieved, and a second graph of that second version is determined. The relevant portion of the first graph is compared to the second graph. If a match is found, the information of interest is extracted from the specified element of the second graph. This allows extraction of information to proceed even if the layout of elements changes.

20 Claims, 6 Drawing Sheets

(51) Int. Cl.
*G06F 16/901* (2019.01)
*G06F 16/958* (2019.01)
*G06F 40/30* (2020.01)

(56) References Cited

U.S. PATENT DOCUMENTS

| | | | | |
|---|---|---|---|---|
| 2017/0011015 A1* | 1/2017 | Dakua | .................. | G06F 40/143 |
| 2018/0285330 A1* | 10/2018 | Punjabi | ................ | G06F 40/143 |
| 2019/0005716 A1* | 1/2019 | Singh | .................... | G06F 40/143 |
| 2020/0401431 A1* | 12/2020 | Rashid | ................... | G06F 40/14 |
| 2021/0312519 A1* | 10/2021 | Sharshevsky | ...... | G06Q 30/0605 |

OTHER PUBLICATIONS

"Graph isomorphism", Wikipedia, 3 pages. Retrieved from the Internet: URL: https://en.wikipedia.org/wiki/Graph_isomorphism on Oct. 27, 2020.
"Graph theory", Wikipedia, 16 pages. Retrieved from the Internet: URL: https://en.wikipedia.org/wiki/Graph_theory on Oct. 26, 2020.
"XPath", Wikipedia, 13 pages. Retrieved from the Internet: URL: http://en.wikipedia.org/wiki/XPath on Oct. 21, 2020.
Zager, et al., "Graph similarity scoring and matching", Applied Mathematics Letters 21 (2008), pp. 86-94.

* cited by examiner

SYSTEM FOR DETERMINING RELIABILITY OF EXTRACTED DATA USING LOCALIZED GRAPH ANALYSIS

BACKGROUND

The internet provides vast quantities of data in the form of semi-structured documents. For example, webpages may include information from merchants detailing product or service listings. As webpages are updated, there may be changes to a visual layout that are not relevant to the reliability of the offered information.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
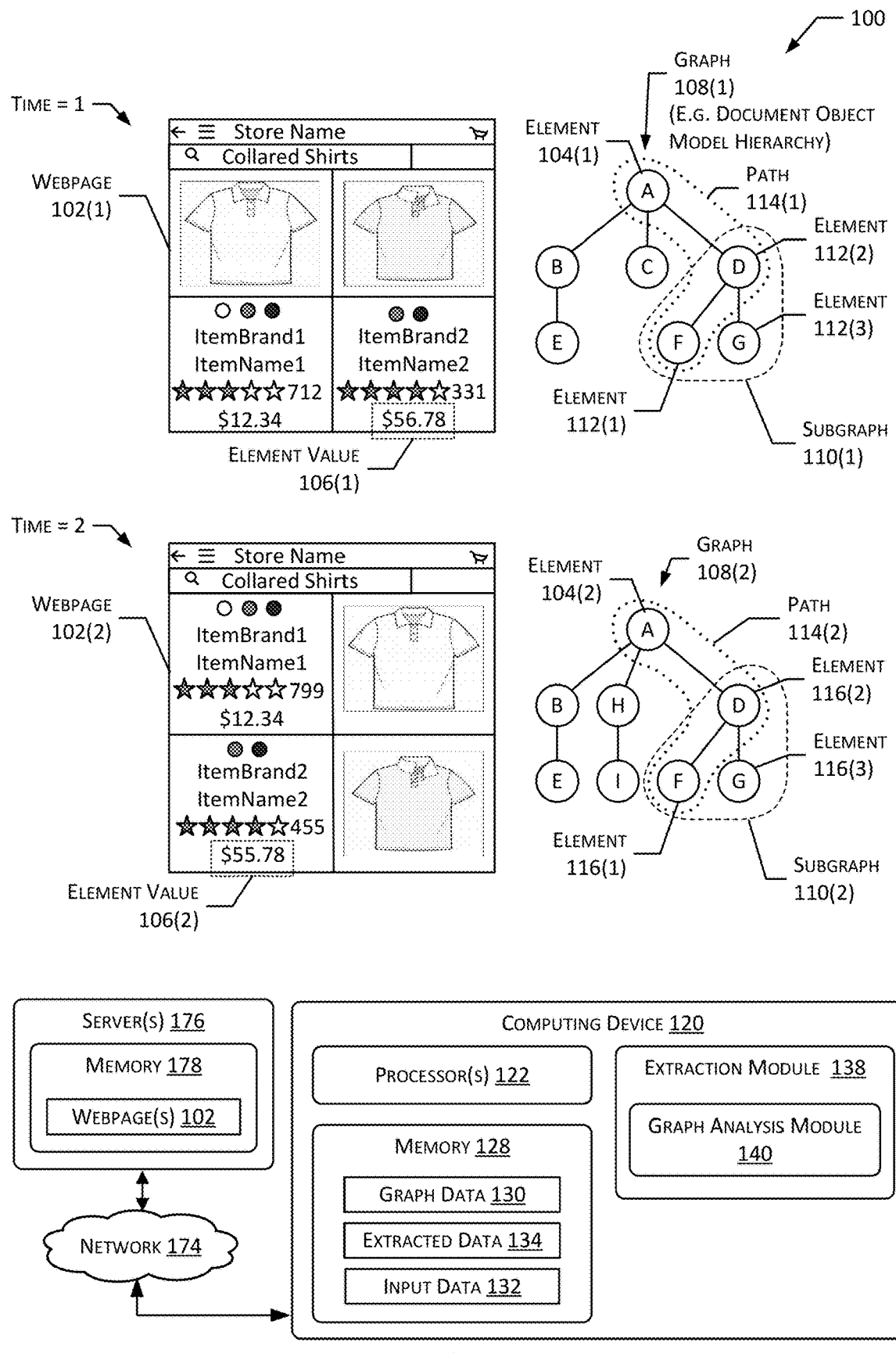
FIG. 1 illustrates a system for extracting information from webpages at different times, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

The amount of digital information available is vast and frequently changing. To identify patterns or useful information, extraction modules may be built to extract information from various digital sources. Information is often stored within documents, such as semi-structured documents, that provide metadata that identifies content and a structure of the content within the documents. Semi-structured data may include tags, markers, or other metadata to describe separate semantic elements and describe hierarchies of records or fields within the data. The structure of the document may be expressed as a hierarchical organization of the contents, or as a graph.

For example, webpages are a common form of semi-structured documents. Webpages may be expressed using Hypertext Markup Language (HTML) to specify elements associated with content and layout of a webpage. A graph may be a representation of a hierarchy of elements associated with a Document Object Model (DOM). While generally discussed in terms of webpages, the techniques described herein apply to the content and structure of other types of documents that may be represented by graphs, including, but not limited to: Extensible Markup Language (XML), Standard Generalized Markup Language (SGML), Cascading Style Sheets (CSS), and so forth.

Information provided by webpages may be useful for a variety of purposes. For example, a merchant may have a relationship with a supplier and may want to track changes in price for one or more items. Continuing this example, a merchant may use a supplier's website to obtain current pricing information, among other types of information. The extraction module disclosed below may reliably extract pricing information from webpages as the structure of the webpages is updated.

To extract information, traditional techniques may parse and extract information from semi-structured documents. For example, traditional techniques may rely on manually developed rules that apply to a current structure of a webpage. However, if the structure of the webpage changes, rules used in traditional techniques may extract unreliable information because the rules do not determine whether changes to a structure of a webpage may produce unreliable information and continue to extract information that may be incorrect due to the changes. Instead, traditional techniques may require updating rules for parsing updated webpages to reflect changes to a new structure of the webpage.

In contrast, to reduce human intervention in extracting reliable information, an extraction module is disclosed to determine whether changes to a structure of a document do not affect reliability of extracted information. For example, when the structure of a document is modified, an extraction module may use localized graph analysis to determine if information extracted after the modification is reliable. Localized graph analysis may determine when changes to a structure of a document affect reliability of extracted information. A system that detects reliability of semi-structured data within modified webpages may free up users from performing a manual assessment of reliability.

Semi-structured data may include webpages, online databases, internet sources, or intranet sources. Semi-structured data may specify elements that have a data type and data attributes, where the semi-structured data may also specify relationships between elements. For example, relationships between elements may correspond to arrangements of elements within a graph, where elements correspond to vertices, and where edges correspond to relationships between elements.

For example, with respect to a webpage, a first element may specify a digital image of an item or service and second element may specify a value indicating a price for the item or service. The first and second elements may be represented within a graph for the webpage. In other examples, a value associated with an element may be any type or quantity of data, such as images, audio content, strings, or numerical values.

Elements in a graph for a webpage may specify each aspect of a visual layout of content and information. The graph may include a large quantity of information and may include individual elements with various amounts of ancestor elements, sibling elements, and descendant elements. If a webpage layout is modified, such as by changing navigation options from a top of the webpage to a side of the webpage, then the graph may also change.

In this example, the layout of a webpage may be changed by modifying the HTML code for the webpage, where the modified HTML code may result in a different graph, and consequently, a different graph of elements for the webpage. However, the changes may not affect the reliability of extracted information. For example, the structure of the navigation elements may change, but elements related to how an item is displayed and how a corresponding item price is displayed may remain unchanged. In this example, the portion of a graph associated with elements related to an item may be a subgraph, where the subgraph may include some combination of ancestor elements, descendant elements, or sibling elements. For example, a subgraph of one or more elements may be associated with an element may include three ancestor elements, one descendant element, and two sibling elements.

Given a subgraph of one or more elements that are associated with an element of the graph from which information is begin extracted, an extraction module may determine that if modifications to the graph of a webpage do not modify the subgraph, then the modifications do not affect the reliability of information associated with the element. In some examples, using the techniques described, information extracted at a first time and a second time from first and second webpages may be determined to be reliable based in part on comparing subgraphs from the first and second webpages associated with the element from which the information is extracted. For example, a first webpage may have a first layout of items and prices at a first time and may have a first subgraph that includes elements related to a first item and a first price. A second webpage at a second time may continue to provide reliable information on the first item and the first price after the first webpage is modified to have a second layout of items and prices.

If extracted information is considered reliable based on the subgraph remaining unchanged or sufficiently similar, then the extracted information may be stored for processing. For example, if the webpage at the first time listed an item for sale at $9.99, and the webpage at the second time listed the item for sale at $8.99, then the change in price may be considered reliable. However, if modifications to the graph of a webpage do modify the subgraph associated with an element, then the extraction module may determine that the information associated with the element may need additional processing to determine reliability.

In some examples, the extraction module determines reliability of extracted information without a semantic analysis of the extracted information. Because the extraction module in some cases does not perform a semantic analysis of extracted information, time and analysis for a user writing domain-specific semantic rules is avoided. Without human intervention for determining reliability of information extracted from modified semi-structured documents, the extraction module may be scaled with limits based on computational resources available.

In other examples, a semantic analysis of extracted information may provide an additional level of confidence in the extracted information. A semantic analysis may include applying a semantic rule indicating a value type associated with an element. For example, if an element is associated with a price, then the value type may be a positive, real number with at most two digits after a decimal point. In this example, if the analysis of subgraphs results in a determination that the extracted information is reliable, but the extracted information is a value that fails to satisfy the semantic rule for a price value, then the extracted information may be determined to be unreliable.

A first webpage may sometimes be part of multiple webpages that are similarly structured. At a first time, a first webpage may have a first subgraph associated with a first element. The multiple webpages may each have subgraphs that are associated with a second element that corresponds to the first element. The first subgraph may match the multiple subgraphs based on a set of relationships between elements of the first subgraph matching a set of relationships between elements of the multiple subgraphs. The first element may correspond to the second element based on the first and second element both being price values for a same or similar item.

At a second time, the multiple webpages may be updated similarly, resulting in similar changes to the multiple subgraphs associated with the second element. The first webpage may also be changed, resulting in similar changes to the first subgraph. In this example, because the modified first subgraph continues to match the multiple subgraphs, the extraction module may determine that extracted information from the first element of the first webpage is reliable.

By using the techniques described in this disclosure, the extraction module may reliably extract information from data sources even as semi-structured documents from the data sources are updated and modified. This allows information extraction to continue without human intervention to determine whether a change to structure data affects reliability of the information being extracted. These techniques substantially reduce or eliminate the time it takes for manual updates of extraction rules written for specific versions of a webpage, and reduces the cost of labor for manually determining reliability of extracted information after webpage modifications.

Illustrative System

FIG. 1 illustrates a system 100 for extracting information from webpages at different times, according to some implementations.

The extraction module 138 may be implemented by a computing device 120 that includes processor(s) 122 and memory 128 storing graph data 130, extracted data 134, and input data 132. Graph data 130 may be determined based on metadata describing a structure and elements of a semi-structured document. Extracted data 134 may include values that have been extracted from semi-structured documents. The computing device 120 may be connected to a network 174 that allows communication with servers 176. Servers 176 may include memory 178 that stores and provides webpages 102. In these examples, the extraction module 128 request webpages 102 by issuing a Hypertext Telnet Protocol (HTTP) request using a Uniform Resource Locator (URL) address associated with website, where a web hosting service may request the webpages 102 from the servers 176.

In some examples, the extraction module 138 may be implemented within an on-premises computing environment, within a cloud computing environment, or within a remote data center. In some examples, the extraction module 138 may be implemented as part of a service, such as a data extraction service. In this example, the data extraction service may provide an application programming interface (API). The API may specify a first call to submit documents or an address for retrieving one or more documents. The API may specify a second call for requesting one or more values associated with the documents provided or identified.

The extraction module 138 may, at a first time=1, access a webpage 102(1). The webpage 102(1) may be a semi-structured document, such as an HTML file associated with graph 108(1). A semi-structured document may be an electronic data file where metadata, or some type of markup, identifies elements of the data file as having meaning in addition to formatting or content. The different elements may be associated with vertices of a graph and relationships between elements may be associated with edges of the graph.

In some examples, the extraction module 138 may determine a graph of elements based on an analysis of extracted data without having access to a source of the data. For example, the extraction module 138 may have access to images of webpages without access to code used to generate the webpage. In this example, an image may have visual elements depicting a layout of products, prices, or other visual depictions that provide information. The extraction module 138 may perform an image analysis to identify each of the visual elements and determine an organizing structure to determine a graph of elements based on the layout of the visual elements.

The layout of the visual components of the webpage 102(1) may correspond to the graph 108(1), where each element {A, B, C, D, E, F, G} may be associated with some portion of the visual components. For example, the displayed price of $56.78 that is associated with the collared shirt "ItemBrand2", may correspond to an HTML element, element 112(1), for displaying text indicating "$56.78". Element 112(1) may be associated with element value 106(1), indicating the ItemBrand2 price as $56.78.

Element 112(1) may be identified based on a query expression that matches portions of the graph 108(1) to provide results that include element 112(1). For example, the query expression may be an XPath, or XML Path Language, where XML indicates Extensible Markup Language. An Xpath may identify one or more paths through a DOM hierarchy, where a path identifies a group of elements connected within the DOM hierarchy. In this example, a path 114(1) goes from the root element 104(1) to element 112(2) and to element 112(1).

Continuing this example, path 114(1) may be associated with a first query expression. An Xpath query expression may identify element 112(1) within a first graph 108(1). The Xpath may also identify element 112(2) within a second graph 108(2) that has a modified hierarchical structure. For example, an Xpath query expression may include wildcard characters or other specifiers for selecting element characteristics within a DOM hierarchy associated with graph 108(1). An Xpath query expression may identify element 112(1) along a first path 114(1) of a first graph 108(1) and along a second path 114(2) of a second graph 108(2) with a different hierarchical structure, where the second path 114(2) may be different from the first path 114(1).

Path 114(1) may identify the element 112(1) within the graph 108(1) at the first time t=1 and also identify element 116(1) within graph 108(2) at time t=2. For example, path 114(2) may be identified by a query expression such as, "/html/<element characteristic 1>/ . . . /<element characteristic N>", where <element characteristic /> may match some characteristic/of some element of graph 108(1). The query expression may be applied to any DOM hierarchy and may return no results or one or more results that match one or more elements with the <element characteristic X> in the order in the query expression along a path of elements. In this way, a query expression may persistently identify a same element within multiple different graphs with different structures based on the different graphs having one or more paths that match the query expression.

Given element 116(1), the extraction module 138 may use a graph analysis module 140 to compare subgraph 110(1) and subgraph 110(2), where subgraph 110(1) is associated with element 112(1), and where subgraph 110(2) is associated with element 116(1). Graph data, including subgraph data, may be stored within graph data 130 in memory 128. In this example, a subgraph is a portion of a graph associated with a given element. A subgraph may be a subset of elements that are connected, directly or indirectly, to the given element. A subgraph may be associated with a set of relationships between the given element and other elements in the subset of elements, including one or more of: one or more elements that are ancestors of the given element, one or more elements that are descendants of the given element, or one or more elements that are siblings of the given element. An ancestor element is an element in the subgraph between a root element and the given element, inclusive of the root element. A descendant element is an element in the subgraph that is connected to a root element by a path that includes the given element. A sibling element is an element in the subgraph that is connected indirectly to the given element by a path that includes an ancestor element in the subgraph.

The graph analysis module 140 may determine that subgraph 110(1) matches subgraph 110(2) based on a first set of relationships between elements of subgraph 110(1) matching a second set of relationships between elements of subgraph 110(2). If each relationship to element 116(1) represented by subgraph 110(2) is similarly represented in subgraph 110(1), then the relationship may be considered to match. For example, if for element 116(1), and relationships between the elements in subgraph 110(2), there are similar relationships in subgraph 110(1) associated with an element that matches element 116(1), then the set of relationships in subgraph 110(1) and subgraph 110(2) match. A first element in subgraph 110(1) matches a second element 110(2) based on the first element and the second element having a same or similar element type or a same or similar attribute type. In this example, if, with respect to two or more subgraphs, both the set of relationships between elements match and the elements match, then the two or more subgraphs are determined to match.

At the first time, webpage 102(1) has a first layout that includes displaying collared shirts horizontally along a top of the webpage 102(1), where element value 106(1) for ItemName2 is $56.78. At the second time, webpage 102(2) has a second layout that includes displaying collared shirts vertically along a side of the webpage 102(2), where element value 106(2) for ItemName2 is $55.78.

In this example, there are three elements 112 in subgraph 110(1) at the first time, and three elements 116 in subgraph 110(2) at the second time. Element 112(1) matches element 116(1), element 112(2) matches 116(2), and element 112(3) matches element 116(3). Element 112(1) has one ancestor relationship to element 112(2) and one sibling relationship to element 112(3). The ancestor relationship between element 112(1) and element 112(2) is matched by the ancestor relationship between element 116(1) and element 116(2).

The sibling relationship between element 112(1) and 112(3) is matched by the sibling relationship between element 116(1) and element 116(3). Given that all elements and all relationships between subgraph 110(1) match subgraph 110(2), subgraph 110(1) matches subgraph 110(2).

Based on subgraph 110(1) matching subgraph 110(2), element value 106(2) is determined to be a reliable modification of element value 106(1). In other examples, element value 106(2) may remain unmodified even if webpage 102(2) is a modified version of webpage 102(1), and then element 106(2) may be determined to be a reliable value for element 116(1).

Figure 2:
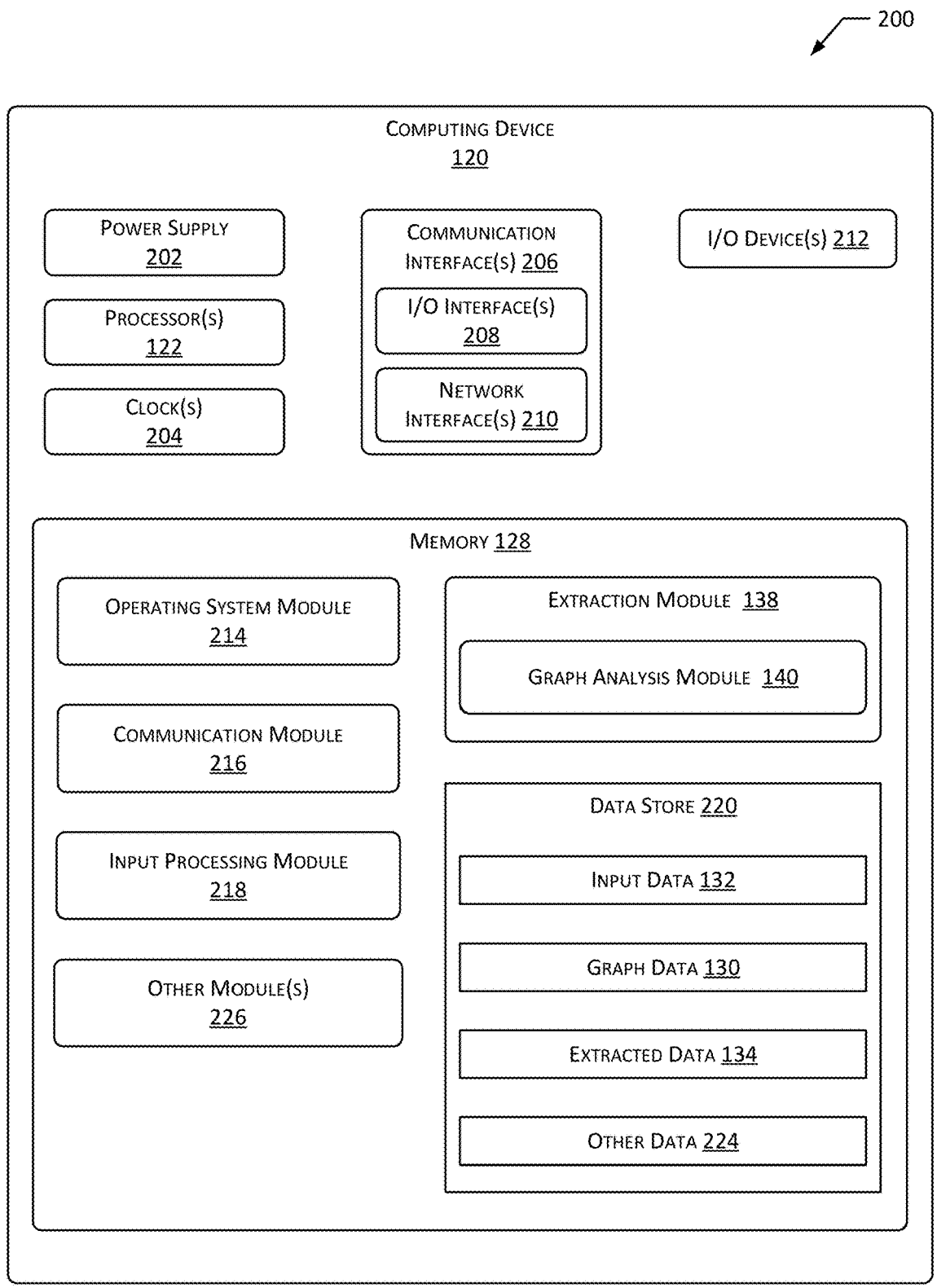
FIG. 2 is a block diagram illustrating a computing device implementing an extraction module, according to some implementations.

FIG. 2 is a block diagram 200 illustrating a computing device 120 implementing an extraction module 138, according to some implementations.

One or more power supplies 202 may be configured to provide electrical power suitable for operating the components of the computing device 120. In some implementations, the power supply 202 may include a rechargeable battery, fuel cell, photovoltaic cell, power conditioning circuitry, and so forth.

The computing device 120 may include one or more hardware processor(s) 122 (processors) configured to execute one or more stored instructions. The processor(s) 122 may include one or more cores. One or more clock(s) 204 may provide information indicative of date, time, ticks, and so forth. For example, the processor(s) 122 may use data from the clock 204 to generate a timestamp, trigger a preprogrammed action, and so forth.

The computing device 120 may include one or more communication interfaces 206, such as input/output (I/O) interfaces 208, network interfaces 210, and so forth. The communication interfaces 206 may enable the computing device 120, or components of the computing device 120, to communicate with other computing devices 120 or components of the other computing devices 120. The I/O interfaces 208 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 208 may couple to one or more I/O devices 212. The I/O devices 212 may include any manner of input devices or output devices associated with the computing device 120. For example, I/O devices 212 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 212 may be physically incorporated with the computing device 120. In other implementations, the I/O devices 212 may be externally placed.

The network interfaces 210 may be configured to provide communications between the computing device 120 and other devices, such as the I/O devices 212, routers, access points, and so forth. The network interfaces 210 may include devices configured to couple to one or more networks including local area networks (LANs), wireless LANs (WLANs), wide area networks (WANs), wireless WANs, and so forth. For example, the network interfaces 210 may include devices compatible with Ethernet, Wi-Fi, Bluetooth, ZigBee, Z-Wave, 3G, 4G, 5G, LTE, and so forth.

The computing device 120 may include one or more busses or other internal communications hardware or software that allows for the transfer of data between the various modules and components of the computing device 120.

As shown in FIG. 2, the computing device 120 may include one or more memories 128. The memory 128 may include one or more computer-readable storage media (CRSM). The CRSM may be any one or more of an electronic storage medium, a magnetic storage medium, an optical storage medium, a quantum storage medium, a mechanical computer storage medium, and so forth. The memory 128 may provide storage of computer-readable instructions, data structures, program modules, and other data for the operation of the computing device 120. A few example modules are shown stored in the memory 128, although the same functionality may alternatively be implemented in hardware, firmware, or as a system on a chip (SoC).

The memory 128 may include one or more operating system (OS) modules 214. The OS module 214 may be configured to manage hardware resource devices such as the I/O interfaces 208, the network interfaces 210, the I/O devices 212, and to provide various services to applications or modules executing on the processors 122. The OS module 214 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 220 and one or more of the following modules may also be associated with the memory 128. The modules may be executed as foreground applications, background tasks, daemons, and so forth. The data store(s) 220 may use a flat file, database, linked list, tree, executable code, script, or other data structure to store information. In some implementations, the data store(s) 220 or a portion of the data store(s) 220 may be distributed across one or more other devices including other computing devices 120, network attached storage devices, and so forth.

A communication module 216 may be configured to establish communications with one or more other computing devices 120. Communications may be authenticated, encrypted, and so forth.

The memory 128 may also store an input processing module 218. The input processing module 218 may receive data indicative of user input. The input processing module 218 may determine one or more functions, commands, or data associated with the user input and may cause the performance of one or more operations in response to the user input. For example, the input processing module 218 may access input data 132 that associates particular commands, functions, or additional data that may be accessed in response to particular types of user input.

Other modules 226 may also be present in the memory 128. For example, other modules 226 may include permission or authorization modules to enable a user to provide authorization to send and receive data associated with the computing device 120. Other modules 226 may also include encryption modules to encrypt and decrypt communications between computing devices 120, authentication modules to authenticate communications sent or received by computing devices 120, a permission module to assign, determine, and manage user permissions to access or modify data associated with computing devices 120, and so forth. Other modules 226 may include modules for presenting interfaces, modifying presentation of interfaces based on user configurations or preferences, and so forth.

Other data 224 within the data store(s) 220 may include configurations, settings, preferences, and default values associated with computing devices 120. Other data 224 may also include encryption keys and schema, access credentials, and so forth.

In different implementations, different computing devices 120 may have different capabilities or capacities. For example, servers 170 may have greater processing capabilities or data storage capacity than user devices.

Figure 3:
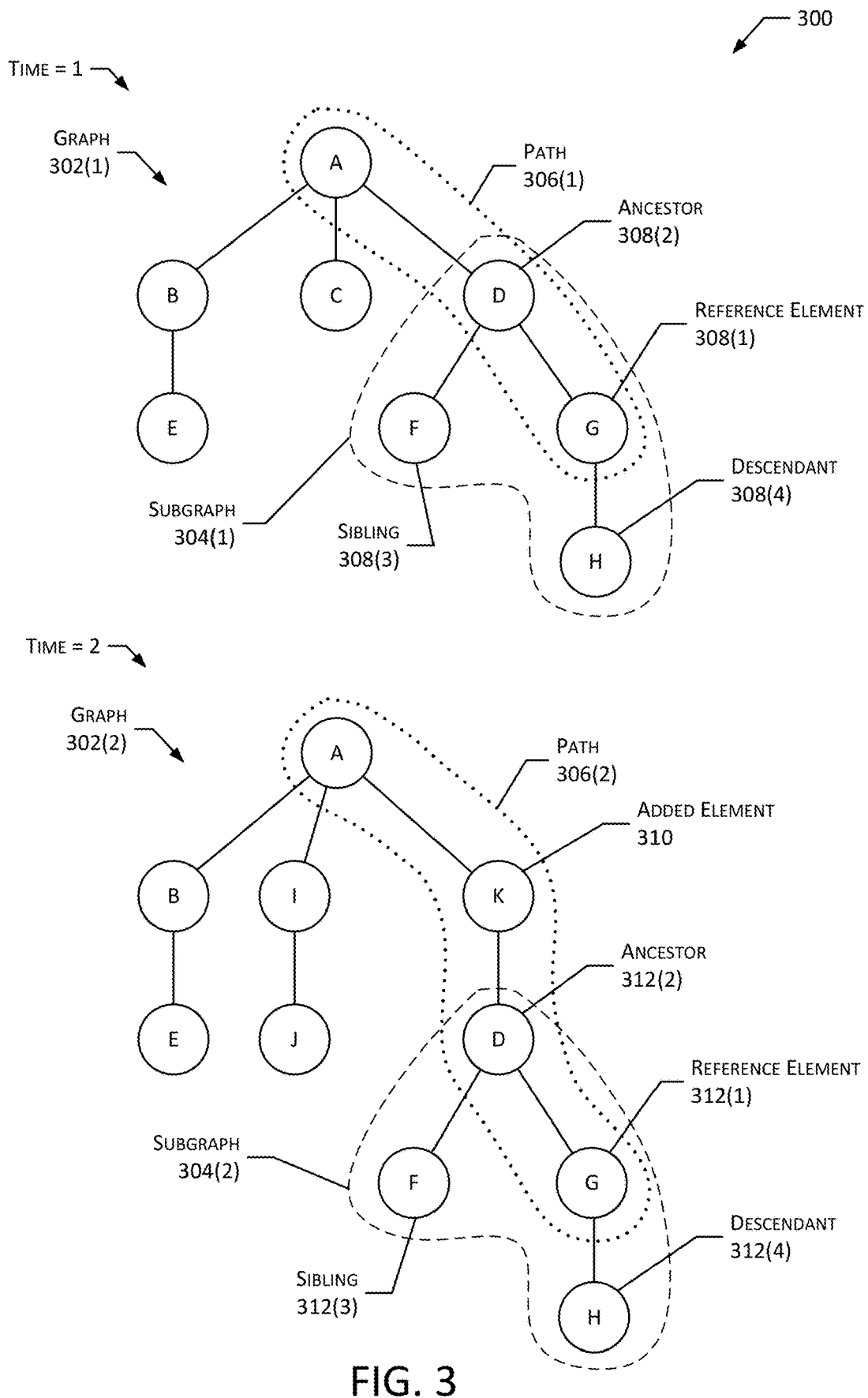
FIG. 3 illustrates subgraphs and paths across different graphs at different times, according to some implementations.

FIG. 3 illustrates at 300, subgraphs and paths across different graphs at different times, according to some implementations.

This illustration depicts a first graph 302(1) at a first time, t=1, and a second graph 302(2) at a second time, t=2. In the first graph 302(1), there is a path 306(1) to a reference element {G} 308(1), and there is a first subgraph 304(1) specified with respect to the reference element {G} 308(1).

In this example, an element 310 is added to the first graph 302(1), and the added element {K} 310 modifies the structure of the first graph 302(1), resulting in the second graph 302(2) at the second time. In this example, a query expression associated with the first path 306(1) is specified with respect to reference element {G} 308(1) in the first graph 302(1). Using the query expression on the first graph 302(1), the first path 306(1) may be used to identify the reference element {G} 308(1). The query expression may be, "/<element A attribute>/*/<element G attribute>", and may result in the first path 306(1) being {element A, element D, element G} in the first graph 302(1) because the attributes of element {A} are matched, the attributes of element {G} are matched, and the wildcard symbol in the query expression matches element {D}.

At the second time, the query expression may be used on the second graph 302(2) and may result in the second path 306(2) being {element A, element K, element D, element G}. At the second time, using the query expression, the attributes of element {A} are matched, the attributes of element {G} are matched, and the wildcard symbol in the query expression matches element {K} and element {D}.

In this way, a same query expression, specified with respect to a first graph 302(1), may identify reference element {G} 308(1) in the first graph 302(1) and also identify reference element {G} 312(1) in the second graph 302(2).

Given the reference element {G} 312(1), the extraction module 138 may the base reliability of a value associated with the reference element {G} 312(1) on the first subgraph 304(1) matching the second subgraph 304(2). The first subgraph 304(1) includes, with respect to reference element {G} 308(1), an ancestor element {D} 308(2), a sibling element {F} 308(3), and a descendant element {H} 308(4). The second subgraph 304(2) includes, with respect to reference element {G} 312(1), an ancestor element {D} 312(2), a sibling element {F} 312(3), and a descendant element {H} 312(4).

As described above with respect to FIG. 1, a first subgraph 304(1) may match a second subgraph 304(2) based upon: (A) a set of relationships between elements of the first subgraph 304(1) matching a set of relationships between elements of the second subgraph 304(2) and (B) the reference element {G} 308(1) matching the reference element {G} 312(1) based on having a same or similar element type or a same or similar attribute type.

In this example, a query expression is used to persistently identify an element of a first graph after the first graph has been modified into a second graph, and the localized subgraph analysis is used to determine reliability of a value associated with the element based on a first subgraph for a first graph matching a second subgraph for a second graph.

In other examples, the extraction module 138 may determine, for a semi-structured source of data, an embedding space to represent elements in a graph. For example, a first semi-structured source of data may be associated with a first graph, and a second semi-structured source of data may be associated with a second graph. The extraction module 138 may compare, with respect to the first graph and the second graph, relative vectors associated with a given element.

Figure 4:
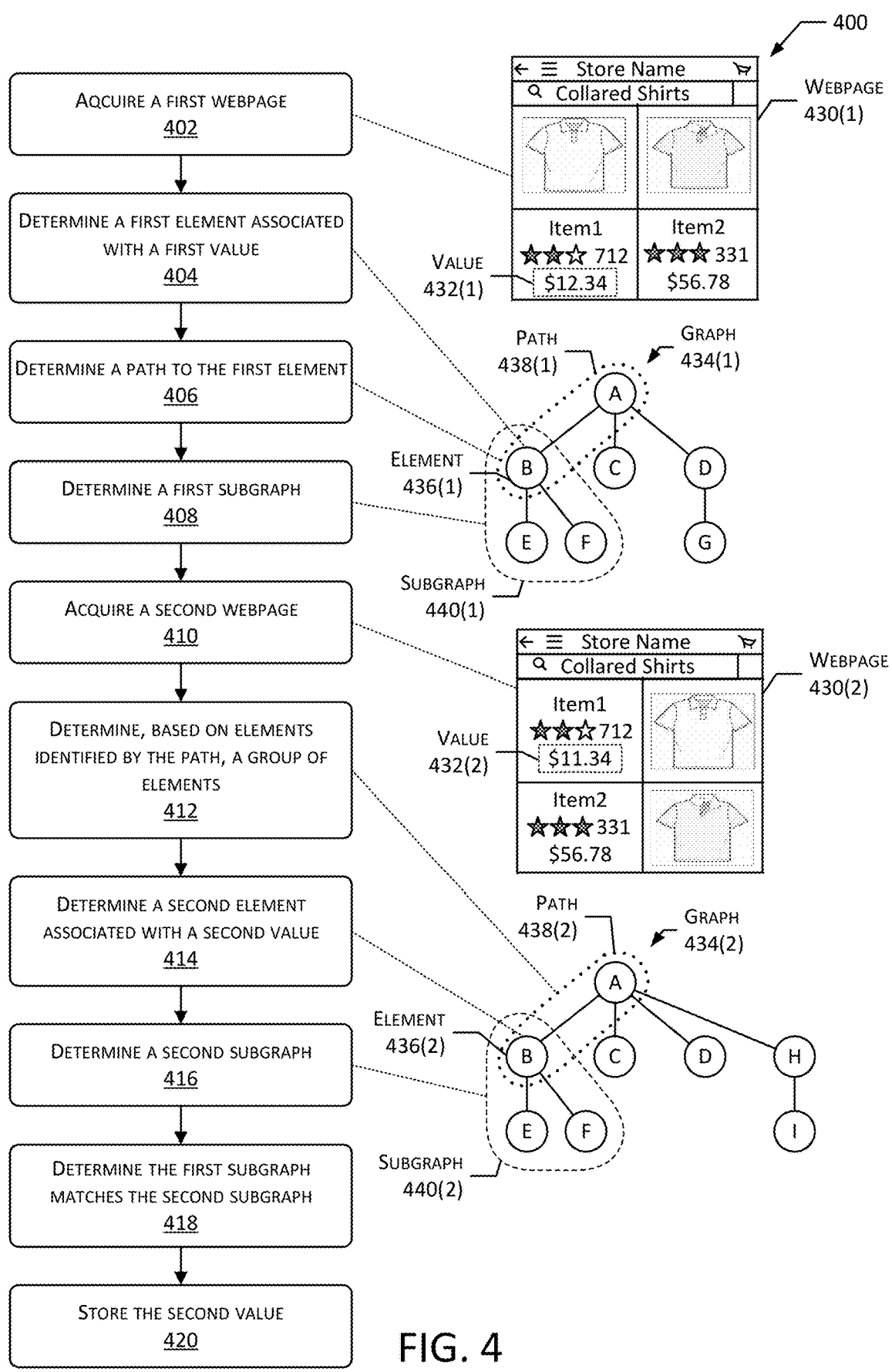
FIG. 4 illustrates a flow diagram of a process to determine reliability of extracted data based on localized subgraph analysis, according to some implementations.

FIG. 4 illustrates at 400, a flow diagram of a process to determine reliability of extracted data based on localized subgraph analysis, according to some implementations.

At 402, the extraction module 138 acquires a first webpage 430(1). For example, the extraction module 138 may acquire a first webpage 430(1), where the first webpage 430(1) includes a first plurality of elements, elements {A, B, C, D, E, F, G}, in a first graph 434(1) indicative of a first DOM hierarchy.

At 404, the extraction module 138 determines a first element {B} 436(1) associated with a first value 432(1), where the first element {B} 436(1) is included within a first plurality of elements {A-G}.

At 406, the extraction module 138 determines a path 438(1) to the first element {B} 436(1) associated with the first value 432(1), where the path 438(1) identifies a first group of elements, elements {A, B}, within the first graph 434(1). As discussed above with respect to FIGS. 1 and 3, a path may be determined by a query expression. In this example, the query expression may match elements that include the first element {B} 436(1).

At 408, the extraction module 138 determines a first subgraph 440(1). The first subgraph 440(1) includes the first element {B} 436(1) and descendant elements {E, F}. As discussed above with respect to FIGS. 1 and 3, a subgraph may be specified with respect to one or more ancestor elements, one or more sibling elements, or one or more descendant elements.

At 410, the extraction module 138 acquires a second webpage 430(2). For example, the second webpage 430(2) may include a second plurality of elements, elements {A, B, C, D, H, E, F, I}, in a second graph 434(2) indicative of a second DOM hierarchy.

At 412, the extraction module 138 determines, based on elements identified by the path 438(2), a second group of elements, elements {A, B}. For example, using the query expression used to identify the first element {B} 436(1) on the first graph 434(1), the extraction module 138 may use the query expression to identify the second element {B} 436(2).

At 414, the extraction module 138 determines the second element {B} 436(2) associated with a second value 432(2). For example, the second element {B} 436(2) may be a last element of the second group of elements along the path 438(2), which includes elements {A, B}, resulting in determining the second element {B} 436(2).

At 416, the extraction module 138 determines a second subgraph 440(2) of the second graph 434(2), where the second subgraph 440(2) includes the second element {B} 436(2). The second subgraph 440(2) is specified using the same specification for a subgraph used to specify the first subgraph 440(1), including a same set of one or more ancestor elements, one or more sibling elements, or one or more descendant elements.

At 418, the extraction module 138 determines the first subgraph 440(1) matches the second subgraph 440(2). For example, determining the first subgraph 440(1) matches the second subgraph 440(2) may be based on a first set of relationships between elements of the first subgraph 440(1) matching a second set of relationships between elements of the second subgraph 440(2). Determining that subgraphs match is described above with respect to FIGS. 1 and 3.

At 420, the extraction module 138 stores the second value 432(2). In this example, based on the localized graph analysis of the subgraphs identified by a path used on two graphs for two different webpages, the second value may be determined to be reliable.

In other examples, the extraction module 138 may determine reliability of extracted data for data extracted from different types of documents. For example, as discussed above, a document may include metadata, tags, or markers to describe elements and an organizational structure of elements. In this example, the extraction module 138 may acquire a first document associated with a first plurality of elements arranged in a first graph. The first plurality of elements may be determined based on metadata in the document, and the metadata may also describe a structure of the first plurality of elements. The extraction module 138 may use the metadata to determine the first graph of the first plurality of elements associated with the first document. Similarly, the extraction module 138 may acquire a second document associated with a second plurality of elements arranged in a second graph. The extraction module 138 may use metadata in the second document to determine the second graph of the second plurality of elements associated with the second document. The extraction module 138 may then determine a first element from the first plurality of elements and determine a first subgraph comprising the first element. A first value may be associated with the first element. The extraction module may determine a second element from the second plurality of elements and determine a second subgraph comprising the second element, where the second element corresponds to the first element. A second value may be associated with the second element. Based on a first set of relationships between elements of the first subgraph matching a second set of relationships between elements of the second subgraph, the extraction module 138 may determine that the first subgraph matches the second subgraph. Based at least on the first subgraph matching the second subgraph, the extraction module 138 may determine that the second value associated with the second element is reliable and store the second value.

Figure 5:
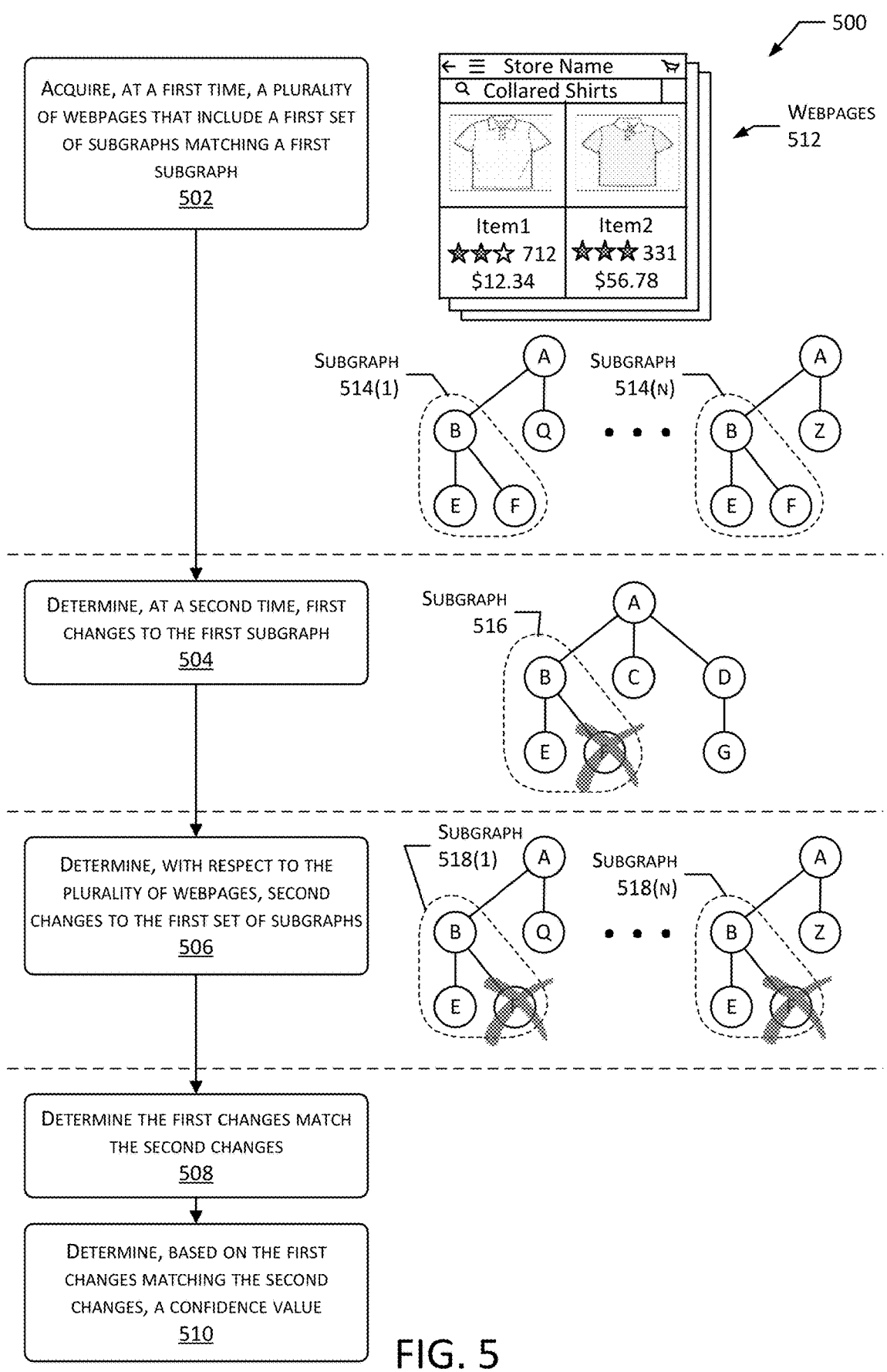
FIG. 5 illustrates a flow diagram of a process to determine reliability of changes to a subgraph, according to some implementations.

FIG. 5 illustrates at 500, a flow diagram of a process to determine reliability of changes to a subgraph, according to some implementations.

At 502, the extraction module 138 acquires, at a first time, a plurality of webpages 512 that include one or more subgraphs in a first set of subgraphs 514(1-N) matching a first subgraph 516. For example, the extraction module 138 may extract information from webpages that are available from a website. The website may organize webpages under categories that share a theme or that share some characteristics. In some examples, the extraction module 138 may use pattern matching algorithms to identify common structures or content of the webpages and use the common structures or content to generate different groups of webpages. Each group of webpages may be determined to be a basis for determining reliability of changes that apply to each of the webpages in a given group.

At 504, the extraction module 138 determines, at a second time, first changes to the first subgraph 516. For example, the extraction module 138 may determine one or more changes to a first set of relationships between elements of the first subgraph 516. For example, at the first time, the first subgraph 514 included elements {B, E, F}, where element {F} has been removed from the first subgraph 516 at the second time. For example, element {F} may have been associated with a hyperlink in a layout for a first webpage associated with the first subgraph 516, where the hyperlink has been removed in a modified version of the first webpage.

At 506, the extraction module 138 determines, with respect to the plurality of webpages, second changes to the first set of subgraphs 514(1-N). The second changes may be determined at a second time. For example, the plurality of webpages 512 and the first webpage may all be directed to a similar product or service and may have a similar webpage layout. A similar webpage layout may be based on webpages having a similar visual organization of one or more of: informational text, prices, images, hyperlinks, navigational elements, or other user interface elements.

In this example, if the plurality of webpages 512 and the first webpage are modified to similarly change one or more aspects of the layout or visual organization aspects, then the change may be determined to be associated with a reliable update to a structure of the graphs for the plurality of webpages 512 and the first webpage.

To determine the second changes to the first set of subgraphs 514(1-N), the extraction module 138 may compare first graphs associated with the plurality of webpages 512 at the first time with second graphs associated with the plurality of webpages 512 at the second time. In this example, each of the first set of subgraphs 514(1-N) has been modified to remove element {F}.

At 508, the extraction module 138 may determine that the first changes match the second changes. For example, the extraction module 138 may determine that the first subgraph 516 matches each of the first set of subgraphs 518(1-N), where matching subgraphs is discussed above with respect to FIGS. 1 and 3.

At 510, the extraction module 138 determines, based on the first changes matching the second changes, a confidence value. For example, the reliability of the update to the first subgraph 516 may be based at least on the first changes matching the second changes.

In other examples, a confidence value associated with reliability of extracted data 134 may be based on a single version of a group of webpages. For example, as described above, the extraction module 138 may use pattern matching algorithms to identify common structures or content of webpages and use the common structures or content to generate different groups of webpages. With respect to a first group of webpages, a first element in a first webpage may be associated with a first subgraph. With respect to the first group of webpages, a plurality of webpages may include a respective second element that is associated with the first element. The respective second element in each of the plurality of webpages may be associated with a respective second subgraph. A confidence value for values associated with the first element may be determined based on the first subgraph matching each of the respective second subgraphs.

Figure 6:
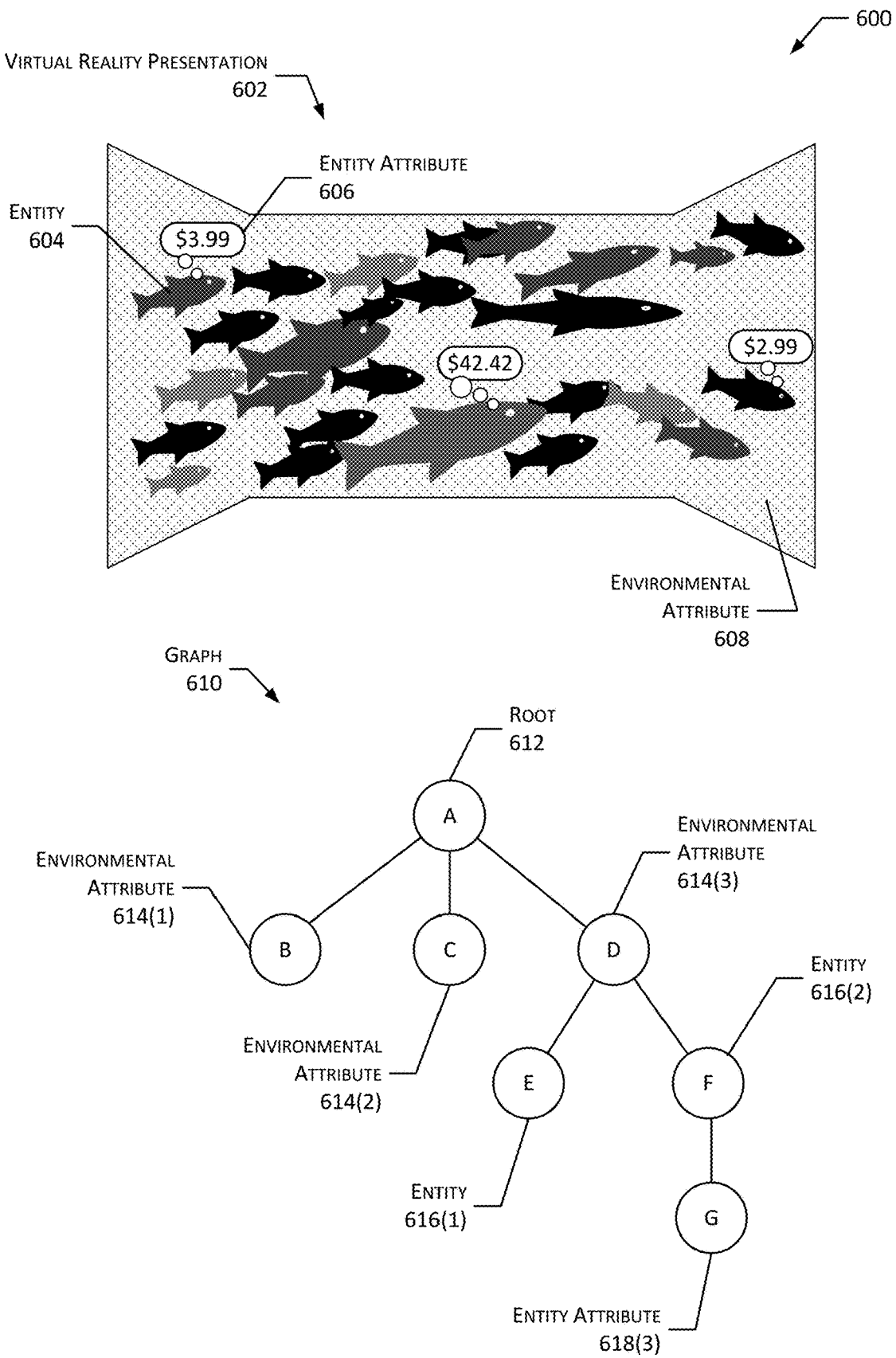
FIG. 6 illustrates a graph indicative of elements within a virtual reality presentation, according to some implementations.

FIG. 6 illustrates at 600, a graph indicative of elements within a virtual reality presentation, according to some implementations.

In this example, a virtual reality presentation 602 may provide an immersive visual and sensory experience to a user. In this example, the virtual reality presentation 602 may include several layers of visual content, including multiple entities, such as fish. For example, the virtual reality presentation 602 may be provided to a user by a merchant selling merchandise relating to aquariums. In contrast to determining a graph based on a DOM hierarchy of a webpage, as described above, a graph of elements may be determined based on an analysis of the visual data of the virtual reality presentation 602. For example, an image analysis may identify a background, different types and sizes of fish, and price data that is associated with different fish.

In this example, the structure of elements within the virtual reality presentation 602 may be represented by a graph 610. The graph 610 may include multiple elements {A, B, C, D, E, F, G} that are associated with different visual depictions of entities, characteristics of entities, or relationships between entities depicted within the virtual reality presentation 602.

The virtual reality presentation 602 may include depictions of different kinds of entities, including various types and sizes of fish, such as entity 604. Entity 604 has an associated entity attribute 606, which, in this example, is indicative of a price of the entity 604. The virtual reality presentation 602 may also include multiple environmental attributes, including environmental attribute 608. Environmental attributes may describe aspects of an environment, such as a background, foreground, colors, lighting, among other visual aspects of an environment.

In this example, with respect to graph 610, element {A} may be root that specifies characteristics of all elements, element {B} may be associated with environmental attribute 614(1), element {C} may be associated with environmental attribute 614(2), element {D} may be associated with environmental attribute 614(3), element {E} may be associated with entity 616(1), element {F} may be associated with entity 616(2), and element {G} may be associated with entity attribute 618. The graph 610, similar to graphs described above with respect to FIGS. 1-5, may be indicative of a set of elements and a set of relationships between elements. In this example, the set of elements and the set of relationships are associated with the virtual reality presentation 602.

In this example, over time, the offerings of the merchant may change, such as by including or removing items for sale, changing prices, or changing other aspects of the virtual reality presentation. The extraction module 138 may acquire the data associated with the virtual reality presentation 602 at different times. If the virtual reality presentation 602 changes, then a graph associated with the virtual reality presentation 602 may also change. Similar to the extraction of values associated with elements of a graph described above, values may be extracted from changing graphs associated with a data source, such as the virtual reality presentation 602.

The extraction module 138 may perform a similar localized subgraph analysis for elements of a graph for a virtual reality presentation 602 to determine reliability of extracted values.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
  acquiring a first webpage, wherein the first webpage includes a first plurality of elements in a first graph;
  determining a first element of the first plurality of elements, wherein the first element is associated with a first cost value;
  determining a path to the first element, wherein the path identifies a first group of elements within the first graph;
  determining a first subgraph of the first graph, wherein the first subgraph includes the first element;
  acquiring a second webpage, wherein the second webpage includes a second plurality of elements in a second graph;
  determining, based on one or more elements of the second plurality of elements identified by the path, a second group of elements within the second graph;
  determining a second element within the second group of elements;
  determining a second subgraph of the second graph, wherein the second subgraph includes the second element;
  determining, based on a first set of relationships between elements of the first subgraph matching a second set of relationships between elements of the second subgraph, that the first subgraph matches the second subgraph; and storing, based at least on the first subgraph matching the second subgraph, a second cost value associated with the second element.

2. The method of claim 1, wherein the first set of relationships between the elements of the first subgraph include one or more of:
a first one or more elements that are ancestors of the first element,
a second one or more elements that are descendants of the first element, or
a third one or more elements that are siblings of the first element; and
wherein the second set of relationships between the elements of the second subgraph include one or more of:
a fourth one or more elements that are ancestors of the second element,
a fifth one or more elements that are descendants of the second element, or
a sixth one or more elements that are siblings of the second element.

3. The method of claim 1, further comprising:
acquiring, at a first time, a plurality of webpages, wherein the plurality of webpages includes one or more subgraphs matching the first subgraph;
determining, at a second time, a first one or more changes to the first set of relationships between elements of the first subgraph;
determining, at the second time and with respect to the plurality of webpages, a second one or more changes to the one or more subgraphs;
determining the first one or more changes matches the second one or more changes; and
determining, based on the first one or more changes matching the second one or more changes, a confidence value associated with the second cost value.

4. A method comprising:
acquiring a first electronic document that includes a first plurality of elements arranged in a first graph;
determining, with respect to the first plurality of elements, a first element associated with a first value;
determining, with respect to the first graph, a first subgraph that comprises the first element;
acquiring a second electronic document that includes a second plurality of elements arranged in a second graph;
determining, with respect to the second plurality of elements, a second element that corresponds to the first element;
determining, with respect to the second graph, a second subgraph that comprises the second element;
determining, based on a first set of relationships between elements of the first subgraph matching a second set of relationships between elements of the second subgraph, the first subgraph matches the second subgraph;
determining, based on an attribute associated with the second element, a semantic rule corresponding to a second value associated with the second element, wherein the semantic rule indicates a first value type associated with the second value matches a second value type;
determining that the second value is in accordance with the semantic rule;

determining, based on the second value being in accordance with the semantic rule, a confidence value associated with the second value; and storing, based at least on the first subgraph matching the second subgraph and the confidence value, the second value associated with the second element.

5. The method of claim 4, further comprising:
determining, with respect to the first graph, a path identifying a first group of elements that includes the first element, wherein the path identifies the first group of elements based on a first one or more attributes of the first group of elements; and
wherein determining that the second element corresponds to the first element is based on the path identifying a second group of elements that includes the second element, and wherein the path identifies the second group of elements based on the first one or more attributes of the first group of elements.

6. The method of claim 4, further comprising:
determining, based on the first graph, a first one or more elements connected directly or indirectly to the first element; and
determining, based on the second graph, a second one or more elements connected directly or indirectly to the second element;
wherein determining the first subgraph matches the second subgraph includes determining relationships between elements of the first one or more elements correspond to relationships between elements of the second one or more elements.

7. The method of claim 4, further comprising:
providing a first service, wherein the first service is associated with an application programming interface (API), wherein the API specifies a first call to submit a webpage, wherein the API provides a second call to request one or more values from the webpage, and wherein the webpage comprises the first plurality of elements.

8. The method of claim 4, wherein the first graph is indicative of a hierarchy of elements of a virtual reality presentation.

9. The method of claim 4, wherein the first set of relationships between the elements of the first graph comprises one or more of:
a first one or more elements that are ancestors of the first element,
a second one or more elements that are descendants of the first element, or
a third one or more elements that are siblings of the first element; and
wherein the second set of relationships between the elements of the second subgraph comprises one or more of:
a fourth one or more elements that are ancestors of the second element,
a fifth one or more elements that are descendants of the second element, or
a sixth one or more elements that are siblings of the second element.

10. The method of claim 4, further comprising:
acquiring, at a first time, a plurality of webpages, wherein the plurality of webpages includes one or more subgraphs matching the first subgraph;
determining, at a second time, a first one or more changes to the first set of relationships between the elements of the first subgraph;

determining, at the second time and with respect to the plurality of webpages, a second one or more changes to the one or more subgraphs;

determining the first one or more changes matches the second one or more changes; and determining, based on the first one or more changes matching the second one or more changes, the confidence value associated with the second value.

11. The method of claim 4, wherein the first value or the second value comprises data indicative of an image, audio content, a string, or numerical value.

12. A system comprising:

one or more memories storing computer-executable instructions; and one or more processors to execute the computer-executable instructions to:

acquire a first electronic document that includes a first plurality of elements arranged into a first graph;

determine, with respect to the first plurality of elements, a first element associated with a first value;

determine, with respect to the first graph, a first subgraph that comprises the first element;

acquire a second electronic document that includes a second plurality of elements arranged into a second graph;

determine, with respect to the second plurality of elements, a second element that corresponds to the first element;

determine, with respect to the second graph, a second subgraph that comprises the second element;

determine, based on a first set of relationships between elements of the first subgraph matching a second set of relationships between elements of the second subgraph, that the first subgraph matches the second subgraph;

determine, based on an attribute associated with the second element, a semantic rule corresponding to a second value, wherein the semantic rule indicates a first value type associated with the second value matches a second value type;

determine the second value is in accordance with the semantic rule;

determine, based on the second value being in accordance with the semantic rule, a confidence value associated with the second value; and store, based at least on the first subgraph matching the second subgraph, the second value associated with the second element.

13. The system of claim 12, wherein the one or more processors further execute the computer-executable instructions to:

determine, with respect to the first graph, a path identifying a first group of elements that includes the first element, wherein the path identifies the first group of elements based on a first one or more attributes of the first group of elements; and wherein determining that the second element corresponds to the first element is based on the path identifying a second group of elements that includes the second element, and wherein the path identifies the second group of elements based on the first one or more attributes of the first group of elements.

14. The system of claim 12, wherein the second value is stored without a semantic analysis of the second value.

15. The system of claim 12, wherein the one or more processors further execute the computer-executable instructions to:

provide a first service, wherein the first service is associated with an application programming interface (API), wherein the API specifies a first call to submit a webpage, wherein the API provides a second call to request one or more values from the webpage, and wherein the webpage comprises the first plurality of elements.

16. The system of claim 12, wherein the first graph is indicative of a hierarchy of elements of a virtual reality presentation.

17. The system of claim 12, wherein the first set of relationships between a first one or more elements of the first graph comprises one or more of:

a third one or more elements that are ancestors of the first element, a fourth one or more elements that are descendants of the first element, or a fifth one or more elements that are siblings of the first element; and wherein the second set of relationships between a second one or more elements of the second subgraph comprises one or more of:

a sixth one or more elements that are ancestors of the second element, a seventh one or more elements that are descendants of the second element, or an eighth one or more elements that are siblings of the second element.

18. The system of claim 12, wherein the one or more processors further execute the computer-executable instructions to:

acquire, at a first time, a plurality of webpages, wherein the plurality of webpages includes one or more subgraphs matching the first subgraph;

determine, at a second time, a first one or more changes to the first set of relationships between the elements of the first subgraph;

determine, at the second time and with respect to the plurality of webpages, a second one or more changes to the one or more subgraphs;

determine the first one or more changes matches the second one or more changes; and determine, based on the first one or more changes matching the second one or more changes, the confidence value associated with the second value.

19. The system of claim 12, wherein the first value or the second value comprises data indicative of an image, audio content, a string, or numerical value.

20. The system of claim 12, wherein the one or more processors further execute the computer-executable instructions to:

determine, based on the first graph, a first one or more elements connected directly or indirectly to the first element; and determine, based on the second graph, a second one or more elements connected directly or indirectly to the second element; and wherein determining the first subgraph matches the second subgraph includes determining relationships between elements of the first one or more elements correspond to relationships between elements of the second one or more elements.

* * * * *